United States Patent
Bloemendaal

(10) Patent No.: US 11,225,387 B2
(45) Date of Patent: Jan. 18, 2022

(54) GRAIN BIN SWEEP APPARATUS

(71) Applicant: Brent J. Bloemendaal, Zionsville, IL (US)

(72) Inventor: Brent J. Bloemendaal, Zionsville, IL (US)

( * ) Notice: Subject to any disclaimer, the term of this patent is extended or adjusted under 35 U.S.C. 154(b) by 0 days.

(21) Appl. No.: 16/589,871

(22) Filed: Oct. 1, 2019

(65) Prior Publication Data

US 2020/0102163 A1    Apr. 2, 2020

Related U.S. Application Data

(60) Provisional application No. 62/739,639, filed on Oct. 1, 2018.

(51) Int. Cl.
*B65G 65/48*    (2006.01)
*A01F 25/20*    (2006.01)

(52) U.S. Cl.
CPC ...... *B65G 65/4845* (2013.01); *A01F 25/2018* (2013.01)

(58) Field of Classification Search
CPC .............. B65G 65/48; B65G 65/4809; B65G 65/4836; B65G 65/4845; A01F 25/2018
See application file for complete search history.

(56) References Cited

U.S. PATENT DOCUMENTS

| | | | |
|---|---|---|---|
| 2,941,677 A * | 6/1960 | Korber ............... | B65G 65/4836 414/325 |
| 3,011,658 A * | 12/1961 | Peterson ............ | B65G 65/4845 198/518 |
| 3,091,350 A * | 5/1963 | Wellford, Jr. ...... | B65G 65/4836 414/325 |
| 3,091,351 A * | 5/1963 | Wellford, Jr. ........... | A01F 25/20 414/325 |
| 3,379,323 A | 4/1968 | Knutsen | |
| 3,407,943 A * | 10/1968 | Douglass, Jr. ..... | B65G 65/4836 414/323 |
| 3,455,470 A | 7/1969 | Kanagy et al. | |
| 3,543,950 A * | 12/1970 | Peterson ............ | B65G 65/4836 198/519 |
| 3,610,444 A * | 10/1971 | Vanhoff ............. | B65G 65/4845 414/304 |
| 3,703,967 A | 11/1972 | Gessler | |
| 3,833,134 A | 9/1974 | Gessler | |
| 3,907,131 A | 9/1975 | Lepley | |

(Continued)

FOREIGN PATENT DOCUMENTS

| | | | |
|---|---|---|---|
| DE | 102010019799 B4 * | 12/2011 | ......... B65G 65/4836 |
| EP | 2385006 A1 * | 11/2011 | ......... B65G 65/4836 |

(Continued)

*Primary Examiner* — Kaitlin S Joerger
(74) *Attorney, Agent, or Firm* — Erickson Kernell IP, LLC; John C. McMahon

(57) ABSTRACT

A grain bin sweep apparatus includes a plurality of elongated grain impellers positioned adjacent a floor of a bin and having an inner ends rotatably supported at a central area of the bin and having an outer ends connected to an endless drive chain mounted in a guide track extending about an outer periphery of the bin and a drive motor engaged with the chain and operable to cause the chain to angularly sweep the impellers about the bin floor to thereby move the grain toward a grain exit of the bin.

24 Claims, 5 Drawing Sheets

(56) References Cited

U.S. PATENT DOCUMENTS

| | | | | |
|---|---|---|---|---|
| 3,942,771 A | * | 3/1976 | Knutsen | B65G 65/4836 366/309 |
| 3,945,537 A | * | 3/1976 | Langen | B65G 65/4836 222/240 |
| 3,999,667 A | * | 12/1976 | Hickman | B65G 65/4845 414/133 |
| 4,003,502 A | * | 1/1977 | Barcell | A01K 5/004 222/168 |
| 4,130,225 A | * | 12/1978 | Illes, Jr. | B65G 65/4836 222/411 |
| 5,271,704 A | * | 12/1993 | Faul | B65G 65/4845 222/228 |
| 5,622,467 A | * | 4/1997 | Pethullis | B65G 65/4836 222/410 |
| 5,702,183 A | * | 12/1997 | Rasimus | B65G 65/4836 222/410 |
| 6,017,180 A | * | 1/2000 | Wilham | B65G 65/4836 406/90 |
| 6,122,838 A | | 9/2000 | Bloemendaal | |
| 7,735,697 B2 | * | 6/2010 | Nordstrom | B65D 88/68 222/410 |
| 7,857,120 B1 | | 12/2010 | Perring et al. | |
| 9,120,633 B2 | | 9/2015 | Ahlen | |
| 9,266,662 B1 | * | 2/2016 | Knepp | B65D 83/0083 |

FOREIGN PATENT DOCUMENTS

| | | | | |
|---|---|---|---|---|
| GB | 2377432 A | * | 1/2003 | B65D 88/68 |
| WO | WO-2004054908 A1 | * | 7/2004 | B65G 65/4872 |
| WO | WO-2007051558 A1 | * | 5/2007 | B65G 65/4836 |

* cited by examiner

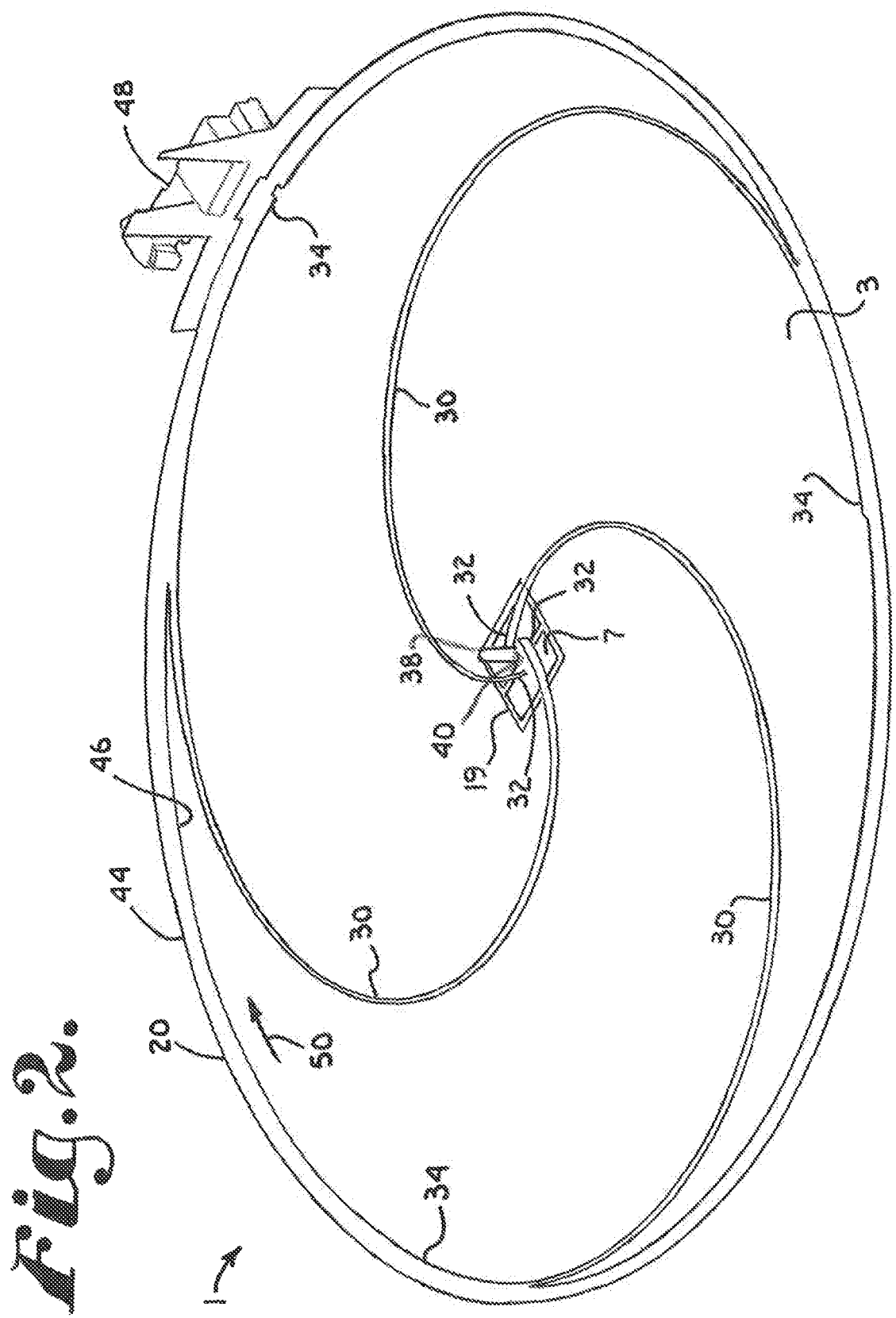

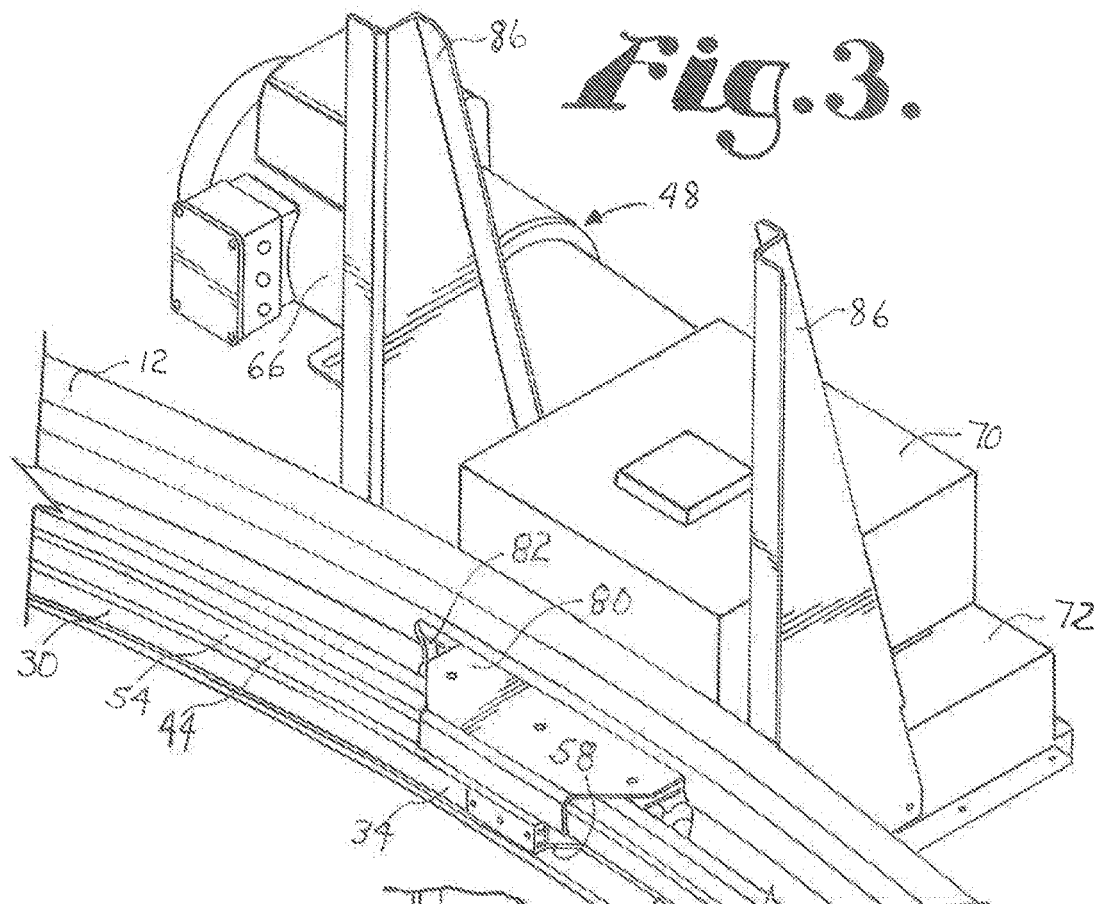

GRAIN BIN SWEEP APPARATUS

CROSS-REFERENCE TO RELATED APPLICATIONS

This application claims the benefit of provisional patent application Ser. No. 62/739,639, filed Oct. 1, 2018 entitled GRAIN BIN SWEEP APPARATUS, the entirety of which is incorporated herein by reference.

BACKGROUND OF THE INVENTION

The present invention is broadly concerned with improvements in apparatus for removing particulate matter, such as grain, from a storage bin and, more particularly, to an improved bin sweep apparatus located at a floor of such a bin.

After harvest, grain is often stored in a grain storage bin or silo. Such a bin usually has a circular floor supporting the grain with a grain exit from which grain may be removed. The bin may have a diametrically extending channel or opening in which a grain auger is positioned. At the beginning of grain removal, the grain falls into the auger channel by gravity and is conveyed away. Once the bulk of the grain stored in the bin has been removed in this manner, a substantial amount of grain remains in the bin, piled up at its natural angle of repose adjacent the bin outer wall. It is then necessary for workers to enter the bin and manually scoop the remaining grain toward the grain exit using brooms, shovels, or the like.

One of the solutions to overcome this problem has been the use of sweep augers to remove the residual grain. A sweep auger is an auger arrangement which is supported on the bin floor, extending radially from a center point, and which rotates angularly thereabout to sweep the grain from the bin floor and convey it to a grain exit, usually at the center of the bin floor. Such sweep augers have been heavy and complex mechanisms which are expensive and which require a considerable amount of energy to operate. Sweep augers often are subject to so-called grain avalanche, which is a cascade of grain that passes over the top of an operating sweep auger, falling on the non-working side where the sweep auger cannot remove this avalanched grain. This requires workers to follow the sweep auger with the intense job of shoveling the avalanched grain back to the working side of the auger.

What is needed is a simpler mechanism for more effectively removing residual amounts of grain from a bin, after the bulk of grain has been removed by gravity, which minimizes the need for manual operations for such removal.

SUMMARY OF THE INVENTION

The present invention provides embodiments of improvements in unloading storage bins for particulate materials, such as grain storage bins. An embodiment of a bin sweep apparatus or system for sweeping a particulate material, such as grain, from a floor of a bin to a material exit positioned at a central area thereof, includes: an elongated particulate material impeller positioned adjacent a floor of a bin and having an inner end rotatably supported at the central area of the bin and having an outer end; an endless impeller drive member extending about an outer periphery of the bin and having the outer end of the impeller connected thereto; and a drive motor engaged with the drive member and operable to move the drive member about the outer periphery of the bin to thereby rotate the impeller to sweep a particulate material toward a material exit or grain exit of the bin.

The impeller is shaped to sweep material toward the material exit at the central area of the bin. The impeller may be flexible and may be substantially spiral in shape whereby angular rotation of the impeller sweeps the material to the centrally located grain exit. Embodiments of the apparatus include a plurality of impellers positioned in circumferentially spaced relation, each impeller having an inner end and an outer end. Each inner end is rotatably supported at a central area of a bin, and each outer end is connected to the drive member. The apparatus may be employed in a bin having a substantially circular outer periphery. Alternatively, the apparatus may be adapted for use a bin having an outer periphery with an elongated shape, such as a substantially rectangular outer periphery, particularly one having rounded ends. With such a rectangular outer periphery, inner end of impeller is rotatably supported in such a manner as to move in an elongated pattern. In embodiments of the apparatus, the impeller drive member includes an endless chain supported to extend about an outer periphery of a bin. The drive motor engages the chain by means of a sprocket engaging the chain and driven by the motor.

An embodiment of the present invention includes a method for sweeping a particulate material from a floor of a bin to a material exit thereof, the bin having a central area and an outer periphery, the method comprising the steps of: extending an endless impeller drive member about an outer periphery of a bin, the drive member having a drive motor drivingly engaged therewith to propel the drive member about the outer periphery of the bin; rotatably supporting an inner end of an elongated particulate material impeller at a central area of a bin and connecting an outer end of the impeller to the drive member, the impeller having such a shape that angular rotation of the impeller causes particulate material engaged thereby to be urged toward a material exit of the bin; and activating the motor to propel the drive member about the outer periphery of the bin to thereby cause angular rotation of the impeller about the central area of the bin.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 2 is an enlarged perspective view of an embodiment of the grain bin sweep apparatus according to the present invention.

FIG. 3 is an enlarged perspective view of a motor mechanism for causing peripheral movement of an endless impeller drive member of the sweep apparatus.

FIG. 4 is a greatly enlarged fragmentary perspective view showing engagement of a drive sprocket with an endless impeller drive chain member of the sweep apparatus.

DETAILED DESCRIPTION OF THE INVENTION

Figure 1:
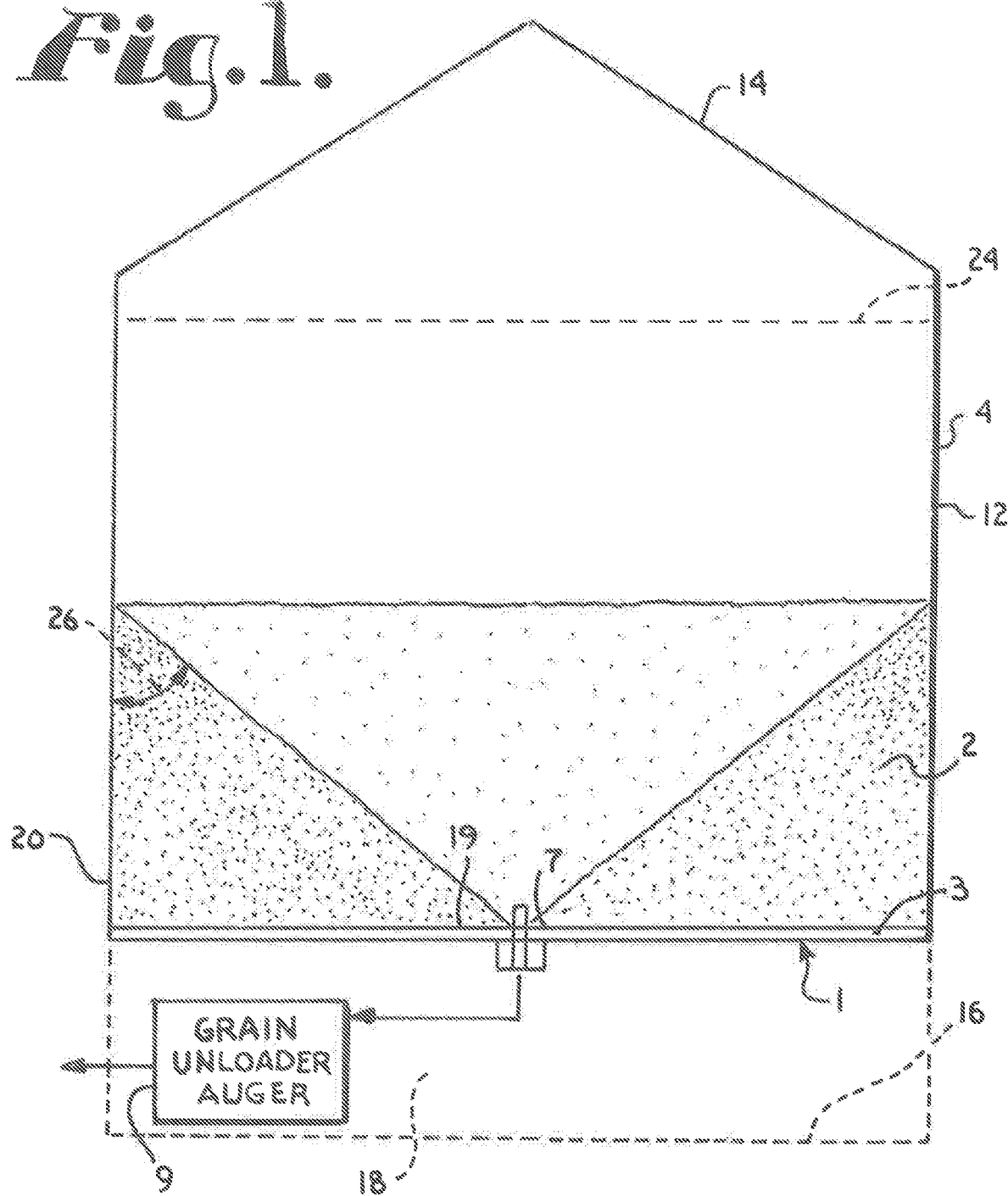
FIG. 1 is a diagrammatic cross sectional view of a grain storage bin in which embodiments of a grain bin sweep apparatus according to the present invention is incorporated.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an embodiment of a grain bin sweep apparatus or system for sweeping particulate material 2, such as grain, from a floor 3 of a storage bin 4 for the material into a material or grain exit 7 for conveyance to another place or vehicle (not shown), as by an unloader auger 9.

The storage bin 4 may be a conventional storage bin or silo which is used to store a particulate material 2, such as an agriculturally produced grain. It is foreseen that the apparatus 1 may also be adapted for use with particulate materials other than agricultural grains. The illustrated bin 4 has a cylindrical outer wall structure or wall 12 and may have a conically shaped roof 14. The bin 4 may have a structural floor 16 with the grain support floor 3 constructed thereabove. Typically, the unloader auger 9 is mounted within a subfloor space 18 between the structural floor 16 and the grain support floor 3, usually in a grain unloading channel (not shown). The grain exit 7 may have a grain exit door (not shown) which is normally closed, but opened for grain unloading operations. Additionally, the grain exit 7 is preferably located at a central area 19 of the grain support floor 3. The bin wall structure 12 forms an outer periphery 20 of the bin 4, which is typically circular. However, it is foreseen that the sweep apparatus 1 could be adapted for use in bins 4 having other outer peripheral shapes, as will be further described below.

For grain storage purposes, the bin 4 is loaded with grain 2 by a loading mechanism (not shown), usually feeding from an upper region of the bin, to an upper grain level 24. The stored grain 2 is supported by the grain support floor 3 with the grain exit 7 closed. During grain unloading, the grain exit 7 is opened and the grain 2 is allowed to fall therethrough where it is conveyed by the unloader auger 9 to another location. In some operations, mechanisms (not shown) are employed to initiate and maintain movement of the grain 2 through the grain exit 7 by gravity. However, at some stage of grain unloading process, the grain 2 remaining in the bin 4 no longer falls by gravity through the grain exit 7 because the remaining grain has reached its natural angle of repose 26 within the bin 4. At this stage, the grain 2 remaining in the bin 4 must be removed using means other than gravity alone. Embodiments of the grain bin sweep apparatus 1 of the present invention may be advantageously applied to remove such remaining grain 2.

Referring to FIG. 2, an embodiment of the sweep apparatus 1 includes a plurality of grain sweeper vanes or sweep impellers 30 extend outwardly from the central area 19 of the grain support floor 3 toward the outer periphery 20 of the bin 4. Each impeller 30 has an inner end 32 and an outer end 34. Each inner end 32 is connected to an impeller hub 38 which is rotationally supported on a hub frame 40 which is supported by the structure of the grain support floor 3 and positioned at the grain exit 7. The illustrated impellers 30 are spirally shaped and are preferably flexible and resilient so that they retain to their original shape when not under load. The illustrated apparatus 1 includes a peripheral track or guide 44 which supports and guides an endless impeller drive member or chain 46. It is foreseen that the drive member 46 could be flexible or substantially rigid. The outer end 34 of each impeller 30 is connected to the drive member 46 in circumferentially spaced relation. A motor mechanism or motor 48 is engaged with the drive member 46 whereby activation of the motor 48 causes the drive member 46 to move along the track 44 about the outer periphery 20 of the bin 4 and thereby move the impellers 30 angularly about the central area 19 of the bin floor 3. Because of the spiral shape of the impellers 30, angular movement of the impellers 30 urges grain 2 on the bin floor 3 toward the grain exit 7.

In an embodiment of the grain sweep apparatus 1, the impellers 30 have a substantially spiral shape such that movement in a desired angular direction 50 urges grain 2 toward the grain exit 7 located at the central area 19 of the bin floor 3. The impellers 30 of the apparatus 1 illustrated in FIG. 2 are spirally shaped in such a manner that their angular movement in a clockwise direction as viewed (indicated by arrow 50) causes grain 2 on the bin floor 3 to be moved toward the centrally located grain exit 7.

Figure 5:
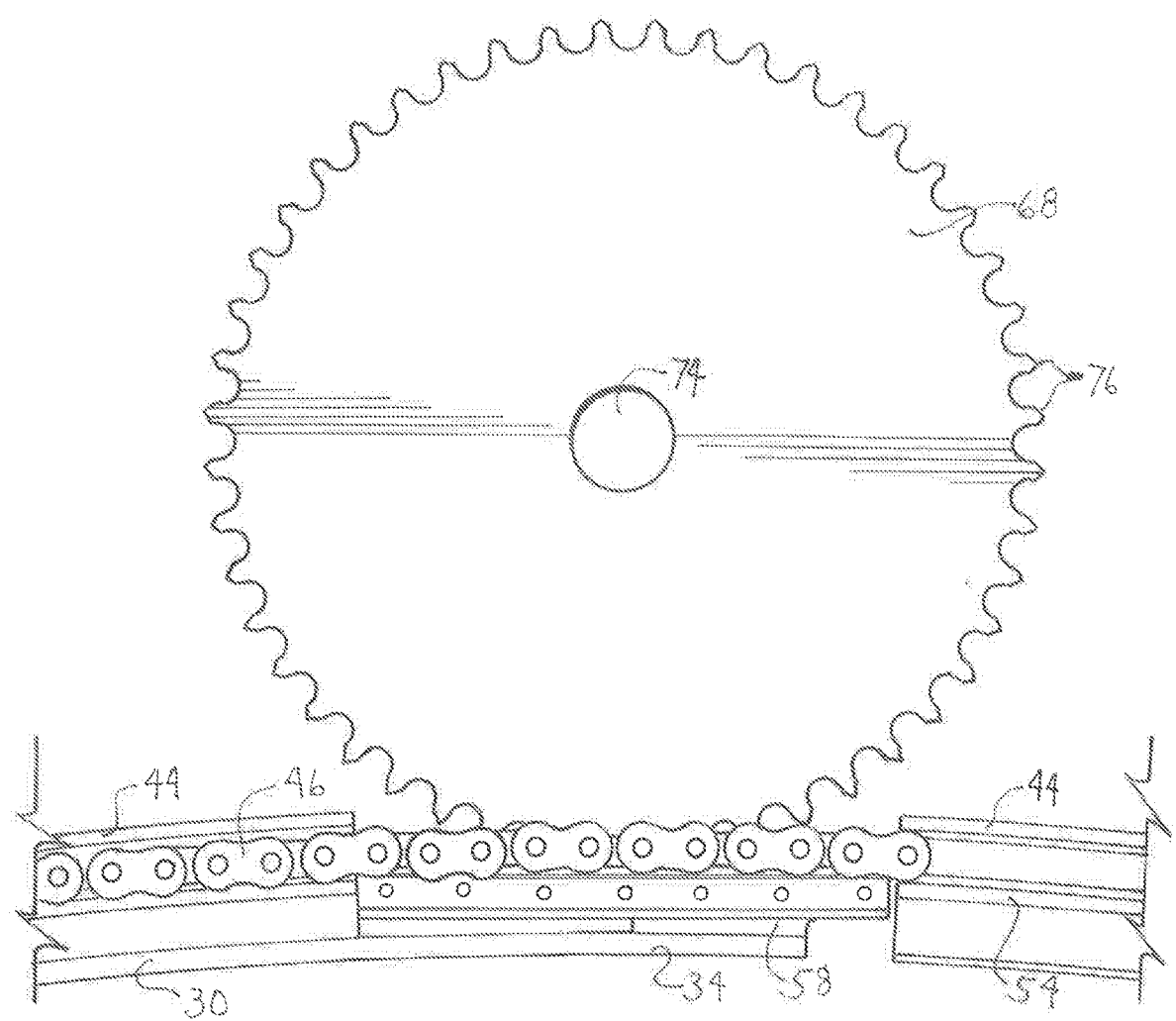
FIG. 5 is a greatly enlarged fragmentary bottom plan showing engagement of the drive sprocket with the impeller drive chain member of the sweep apparatus.

Referring to FIGS. 3-5, the impeller drive member or chain 46 extends through the peripheral guide track 44. The illustrated track 44 has an inverted U-shape and is mounted on the bin floor 3 and supported by the bin outer wall 12. The track 44 has an inner wall 54 which has a gap or space 56 between the wall 54 and the bin floor 3. Each of the outer ends 34 of the impellers 30 is connected to the chain 46 by an L-shaped bracket 58 which has an upper leg 60 connected to the impeller 30 and a lower leg 62 connected to the chain 46 through the gap 56. As the impellers 30 are driven through the guide track 44, the lower legs 62 of the brackets 58 ride through the gap 56 below the inner wall 54 of the track 44.

The illustrated impeller drive motor mechanism 48 includes an impeller drive motor 66, such as an electric motor, which drives a sprocket 68 through a gear mechanism (not shown) positioned in a gear housing 70. The sprocket 68 may be positioned in a sprocket housing 72 and is mounted on a sprocket shaft 74 extending from the gear mechanism. Sprocket teeth 76 of the sprocket 68 engage the chain 46 through a gap or opening 78 in an outer wall of the track 44 to urge the chain 46 about the track 44 when the drive motor 66 is activated.

In order to effect positive engagement of the sprocket 68 with the chain 46, the illustrated sweep apparatus 1 provides an abutment bracket 80 which extends through the bin wall 3 from the sprocket housing 72. The bracket 80 engages the track 44 in the area of engagement of the sprocket 68 with the chain 46 and reinforces the track 44 to avoid a tendency of the chain 46 to move away from the sprocket 68 under load. The bracket 80 and the sprocket 68 extend through an opening 82 formed in the bin wall 12. Components of the motor mechanism 48 are supported by structural members 86 which may be supported by the bin wall structure 12. As illustrated, components of the motor mechanism 48 are positioned outside of the bin 4 and are, thus, accessible for maintenance without entry into the bin 4.

Figure 6:
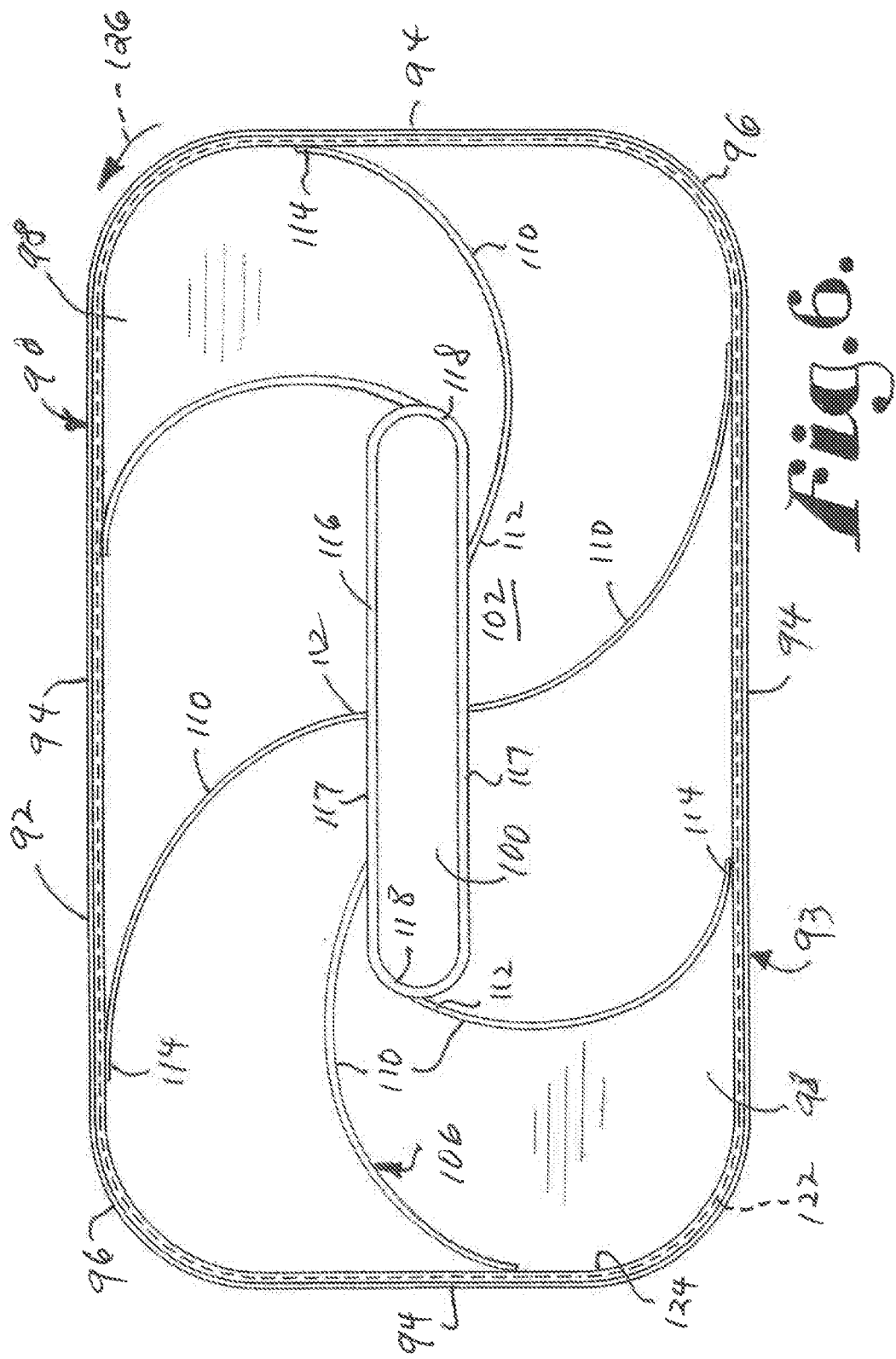
FIG. 6 is a diagrammatic top plan view of a modified embodiment of the bin sweep apparatus according to the present invention for use in a bin having an elongated or substantially rectangular periphery.

Grain storage bins 4 typically have a circular or cylindrical outer periphery 20. FIG. 6 illustrates a bin 90 having a substantially rectangular or elongated outer periphery 92. The illustrated periphery 92 is formed by an outer bin wall structure or wall 93 including substantially straight side walls 94 connected by rounded corner walls 96. The grain bin sweep apparatus 1 is adaptable to the illustrated rectangular periphery 92 of the bin 90 and to bins having other non-circular outer peripheries.

The bin 90 includes a bin floor 98 to support particulate matter or grain (not shown) within the bin. The illustrated bin 90 includes a grain exit 100 located at a central area 102 of the bin floor 98, through which grain may be unloaded in cooperation with conventional types of grain unloading machinery, such as an unloading augur (not shown), located beneath the bin floor 98. Grain may be typically unloaded by enabling it to fall by gravity through grain exit 100, to be carried away by the unloading augur until the grain in the bin 90 reaches its angle of repose 26 (FIG. 1). The illustrated bin 90 is provided with a grain bin sweep apparatus or system 106 according to the present invention to sweep grain from the bin floor 98 after the grain has reached its angle of repose 26.

The illustrated sweep apparatus 106 includes a plurality of sweep impellers or vanes 110, each impeller 110 having an inner end 112 and an outer end 114. Each inner end 112 is slidably engaged with an elongated or oval inner guide track 116 having spaced apart side sections 117 and rounded end sections 118. Each impeller 110 has the outer end 114 connected to an endless flexible impeller drive member or chain 122 extending through an outer guide track 124 positioned about the outer periphery 92 of the bin 90 adjacent the outer bin wall 93. The impellers 110 are substantially spirally shaped and are preferably flexible and resilient so that they retain to their original shape when not under load.

The guide track 124 and the chain 122 may be substantially similar to the guide track 44 and chain 46 of the apparatus 1. The chain 122 may be engaged and driven by an impeller drive motor mechanism (not shown) substantially similar to the motor mechanism 48 of the apparatus 1. Movement of the chain 122 in a generally counterclockwise direction as viewed (indicated by the arrow 126) angularly sweeps the impellers 110 about the periphery 92 to thereby sweep grain on the bin floor 98 into the bin exit 100. If the impellers 110 were curved in the opposite direction from that shown in FIG. 6, the chain 122 would be driven in an opposite or clockwise direction.

The impellers 110 are equal in length, and the outer ends 114 are secured to the chain 122 at equal intervals along the chain 122 in a manner similar to the connection of the outer ends 32 of the impellers 30 of the apparatus 1. In contrast, the inner ends 112 of the impellers 110 may slide freely along the inner guide track 116, such that the inner ends 112 may not always be at equally spaced locations along the inner track 116. Because of the flexibility of the impellers 110, they are able flex to thereby cover areas of the bin floor 98 near the rounded corner walls 96. Because of the spiral shape of the impellers 110, angular movement of the impellers 110 in the direction indicated by the arrow 126 urges grain on the bin floor 98 toward the grain exit 100.

It is to be understood that while certain forms of the present invention have been described and illustrated herein, it is not to be limited to the specific forms or arrangement of parts described and shown.

What is claimed and desired to be secured by Letters Patent is:

1. A bin sweep apparatus for sweeping a particulate material from a floor of a bin to a material exit thereof, the bin having a central area and an outer periphery, and the apparatus comprising:
   (a) a hub frame located in the central area of the bin floor; an impeller hub rotationally mounted on the hub frame;
   (b) an elongated particulate material impeller positioned adjacent a floor of a bin and having an inner end rotatably joined to the impeller hub in the central area of the bin so as to allow rotation of the impeller inner end to rotate about the central area and having an outer end;
   (c) co an endless impeller drive member extending about an outer periphery of the bin and having the outer end of the impeller connected thereto; and
   (d) a drive motor engaged with the drive member and operable to move the drive member about the outer periphery of the bin so as to motivate the impeller outer end about the outer periphery and to thereby rotate the impeller relative to the central area and to sweep a particulate material toward the material exit of the bin.

2. An apparatus as set forth in claim 1 wherein:
   (a) the impeller is flexible.

3. An apparatus as set forth in claim 1 wherein a material exit of a bin is located at a central area thereof and wherein:
   (a) the impeller is shaped to sweep material toward a central area of the bin.

4. An apparatus as set forth in claim 1 wherein:
   (a) the impeller is substantially spiral in shape.

5. An apparatus as set forth in claim 1 and including:
   (a) a plurality of impellers positioned in circumferentially spaced relation, each impeller having an inner end and an outer end;
   (b) each inner end is rotatably supported by the hub at a central area of the bin; and
   (c) each outer end is connected to the drive member.

6. An apparatus as set forth in claim 1 wherein:
   (a) the apparatus is positioned in the bin having a substantially circular outer periphery.

7. An apparatus as set forth in claim 1 wherein:
   (a) the apparatus is positioned in the bin having an outer periphery of an elongated shape; and
   (b) inner end of impeller is rotatably supported in such a manner as to move in an elongated pattern.

8. An apparatus as set forth in claim 1 wherein:
   (a) impeller drive member includes an endless chain supported to extend about an outer periphery of the bin; and
   (b) the drive motor engages the chain by means of a sprocket.

9. A bin sweep apparatus for sweeping a particulate material from a floor of a bin to a material exit located at a central area thereof, the bin having an outer periphery, and the apparatus comprising:
   (a) a rotatable hub mounted on the central area of the floor of the bin;
   (b) an elongated, highly flexible particulate material impeller positioned adjacent a floor of a bin and having an inner end joined to the hub in a central area of the bin so as to be rotatable about the central area and having an outer end;
   (c) an endless impeller drive member extending about an outer periphery of the bin and having the outer end of the impeller connected thereto; and (d) a drive motor engaged with the drive member and operable to move the drive member about the outer periphery of the bin to thereby motivate the impeller outer end to move about the outer periphery and to rotate the impeller to sweep a particulate material toward the material exit of the bin.

10. An apparatus as set forth in claim 9 wherein:
(a) the impeller is substantially spiral in shape.

11. An apparatus as set forth in claim 9 and including:
(a) a plurality of impellers positioned in circumferentially spaced relation, each impeller having an inner end and an outer end;
(b) each inner end is rotatably supported by the hub at a central area of the bin; and
(c) each outer end is connected to the drive member.

12. An apparatus as set forth in claim 9 wherein:
(a) the apparatus is positioned in the bin having a substantially circular outer periphery.

13. An apparatus as set forth in claim 9 wherein:
(a) the apparatus is positioned in the bin having a substantially rectangular outer periphery.

14. An apparatus as set forth in claim 9 wherein:
(a) the apparatus is positioned in the bin having substantially rectangular outer periphery; and
(b) inner end of impeller is rotatably supported in such a manner as to move in an elongated pattern.

15. An apparatus as set forth in claim 9 wherein:
(a) impeller drive member includes an endless chain supported to extend about an outer periphery of the bin; and
(b) the drive motor engages the chain by means of a sprocket.

16. A bin sweep apparatus for sweeping a particulate material from a floor of a bin to a material exit thereof, the bin having a central area and an outer periphery, and the apparatus comprising:
(a) a hub rotatably mounted on the central area of the bin floor;
(b) a plurality of elongated particulate material impellers constructed of flexible chain positioned in circumferentially spaced relation to one another and adjacent a floor of a bin, each impeller having a respective inner end joined to the hub to allow rotation of the inner end of each impeller about the central area of the bin and having a respective outer end;
(c) an endless impeller drive member extending about an outer periphery of the bin and having the outer end of each impeller connected thereto; and
(d) a drive motor engaged with the drive member and operable to move the drive member about the outer periphery of the bin to thereby motivate the impeller outer ends around the outer periphery of the bin so as to pull the impellers about the periphery and to rotate the impellers about the central area to sweep a particulate material toward the material exit of the bin.

17. An apparatus as set forth in claim 16 wherein a material exit of the bin is located at a central area thereof and wherein:
(a) each impeller is shaped to sweep material toward a central area of the bin.

18. An apparatus as set forth in claim 16 wherein:
(a) each impeller is substantially spiral in shape.

19. An apparatus as set forth in claim 16 wherein:
(a) the apparatus is positioned in the bin having a substantially circular outer periphery.

20. An apparatus as set forth in claim 16 wherein:
(a) the apparatus is positioned in the bin having a substantially rectangular outer periphery.

21. An apparatus as set forth in claim 16 wherein:
(a) the apparatus is positioned in the bin having substantially rectangular outer periphery; and
(b) inner end of each impeller is rotatably supported in such a manner as to move in an elongated pattern.

22. An apparatus as set forth in claim 16 wherein:
(a) impeller drive member includes an endless chain supported to extend about an outer periphery of the bin; and
(b) the drive motor engages the chain by means of a sprocket.

23. A method for sweeping a particulate material from a floor of a bin to a material exit thereof, the bin having a central area and an outer periphery, the method comprising the steps of:
(a) a hub rotatably mounted on the central area of the bin floor;
(b) extending an endless impeller drive member about an outer periphery of a bin, the drive member having a drive motor drivingly engaged therewith to propel the drive member about the outer periphery of the bin;
(c) attaching an inner end of an elongated particulate material impeller at a central area of the bin to the hub so as to be rotatable about the central area and so as to allow rotation of the inner end about the central area of the bin and also connecting an outer end of the impeller to the drive member, the impeller having such a shape that angular rotation of the impeller causes particulate material engaged thereby to be urged toward a material exit of the bin; and
(d) activating the motor to propel the drive member about the outer periphery so as to motivate the impeller outer end about the periphery of the bin such that the impeller is driven to circulate about the bin to thereby drive the particulate material to the material exit.

24. A bin sweep apparatus for sweeping a particulate material from a floor of a bin to a material exit thereof, the bin having a central area and an outer periphery, and the apparatus comprising:
(a) an elongated particulate material impeller positioned adjacent the floor of the bin and having an inner end rotatably supported at a central area of the bin and having an outer end;
(b) an endless impeller drive member extending about an outer periphery of the bin and having the outer end of the impeller connected thereto;
(c) a drive motor engaged with the drive member and operable to move the drive member about the outer periphery of the bin to thereby rotate the impeller to sweep a particulate material toward a material exit of the bin; and
(d) the apparatus is positioned in a bin having a substantially rectangular outer periphery.

\* \* \* \* \*